United States Patent [19]
Johnson

[11] 3,990,477
[45] Nov. 9, 1976

[54] FORCE BALANCED VALVE SPOOL
[75] Inventor: Howard L. Johnson, Joliet, Ill.
[73] Assignee: Caterpillar Tractor Co., Peoria, Ill.
[22] Filed: Jan. 30, 1976
[21] Appl. No.: 653,860

Related U.S. Application Data
[63] Continuation of Ser. No. 355,542, April 30, 1973, abandoned.

[52] U.S. Cl. ............................. 137/625.69; 251/282
[51] Int. Cl.² ........................................ F16K 11/07
[58] Field of Search ................. 137/625.69, 625.37, 137/625.34; 251/282, 21, 324; 91/446, 465

[56] References Cited
UNITED STATES PATENTS

| | | | |
|---|---|---|---|
| 2,718,240 | 9/1955 | Margrave | 137/625.69 |
| 2,831,496 | 4/1958 | Jensen | 251/282 X |
| 3,729,026 | 4/1973 | Wilke | 137/625.69 |
| 3,735,780 | 5/1973 | Heid | 137/625.69 |

Primary Examiner—Martin P. Schwadron
Assistant Examiner—Robert J. Miller
Attorney, Agent, or Firm—Phillips, Moore, Weissenberger, Lempio & Strabala

[57] ABSTRACT

A flow control valve includes a valve body defining a main bore and a cross-drilled bore communicating therewith. A valve spool is reciprocable within the main bore and includes first and second lands connected by a reduced diameter connecting portion. The connecting portion has fixed relative thereto and thereabout an annular rib, positioned between the two lands. The rib acts as a guide to direct fluid substantially perpendicular to the axis of reciprocal motion of the spool when the spool is positioned to allow fluid flow between the main and cross-drilled bores, to minimize fluid flow forces tending to hold the spool in an open position.

2 Claims, 3 Drawing Figures

FORCE BALANCED VALVE SPOOL

This is a continuation of Ser. No. 355,542, filed Apr. 30, 1073, now abandoned.

BACKGROUND OF THE INVENTION

This invention relates to flow control valves, and more particularly, to a flow control valve which includes guide means to minimize fluid flow forces tending to hold the spool open.

It is common for fluid control valves to include annularly notched valve spools which are reciprocable in cylidrical bores of a housing. A plurality of fluid passages are disposed in the housing in intersecting relation with such bores in order to direct fluid from a source to various implements or the like for operation thereof. As fluid enters such a bore, it impinges on the various surfaces of the valve spool when the valve is metering or in its open position and generates axial thrust forces on the spool which tend to hold the spool open. This problem is particularly noticeable in high pressure circuits using in the order of 2,000 psi or more and having relatively high flow rates.

Such flow-generated axial force means that the force required to move the spool towards the open position is less than the force required to close it, which is a very undesirable state. In manually positioned valve spool systems, such unequal forces are not only distracting to the operator of the valve, but could add a dimension of complexity that could be dangerous. In automatic or servo-operated spool positioning systems, as well as the manually operated type, the different force requirements could deterimentally affect the rate of response of the spool in each direction of movement thereof, or make it necessary to increase the forces associated therewith to overcome the dynamic fluid biasing forces, such as by adding heavier spool reaction springs or the like, which would be undesirable from a performance standpoint.

Such flow-generated fluid forces have been recognized as a significant problem heretofore, and reference is made to U.S. Pat. Nos. 2,971,536 to Junck et al and 3,198,212 to Junck et al, both assigned to the Assignee of the present invention. However, adding metering slots or tapered surfaces to the spool on the downstream side of the metering path in an attempt to impart axially balancing thrust forces does not always produce the desired results. In addition, the relatively sophisticated nature of the slot dimensions and tapers makes it necessary to resort to extensive testing programs before successful results can be achieved.

In addition, as will later be described, the use of a cross-drilled fluid inlet passage rather than a complete fluid inlet annulus in the housing adds to the difficulty of directing flow adequately without contributing significantly to side loads on the spool.

Reference is also made to U.S. Pat. No. 3,620,230 to Stahle, which includes an axial thrust generating barrier in combination with the housing thereof. Such barrier, it will be seen, would interfere with axial movement of the spool thereof after limited travel of said spool, and would also interfere with the free removal of the valve spool for servicing thereof. In addition, it is to be appreciated that constructional changes for the purpose of flow control in such a valve should preferably be made to the spool itself, rather than in combination with the housing, as such modifications are substantially less costly than modifying the internal passages within a housing.

Of more general interest in this area are U.S. Pat. No. 2,747,612 to Lee U.S. Pat. No. 2,812,775 to Hodgson, and U.S. Pat. No. 3,009,480 to Miller.

SUMMARY OF THE INVENTION

It is an object of this invention to provide a valve incorporating a reciprocable valve spool which is in a substantially force balanced state when said valve spool is positioned to allow fluid flow through the valve.

It is a further object of this invention to provide a valve which, while fulfilling the above object, incorporates a main bore in which the valve spool is reciprocable, and a cross-drilled bore of smaller diameter than the main bore and which extends through and within the main bore.

It is a still further object of this invention to provide a flow control valve which, while fulfilling the above objects, is extremely simple in design and efficient in use.

Broadly stated, this invention is a flow control valve comprising a valve body defining a main bore and a cross bore extending into, through and beyond the main bore. a valve spool is reciprocable along a line of motion within the main bore and defines first and second lands connected by a conecting portion which defines groove means between the first and second lands. The valve spool is movable along the line of motion to a first position wherein the first and second lands are on either side of the cross-bore and in blocking relation with the valve body within the main bore, and to a second position wherein the first land is moved into the cross bore to allow fluid flow between the cross bore and main bore, the second land moving with the first land away from the cross bore. Guide means are connected to the valve spool for guiding fluid flow between the cross bore and main bore through the groove means in a direction substantially perpendicular to the line of motion of the valve spool.

BRIEF DESCRIPTION OF THE DRAWINGS

These and other objects of the invention will become apparent from a study of the following specification and drawings, in which.

DESCRIPTION OF THE PREFERRED EMBODIMENT

Figure 1:
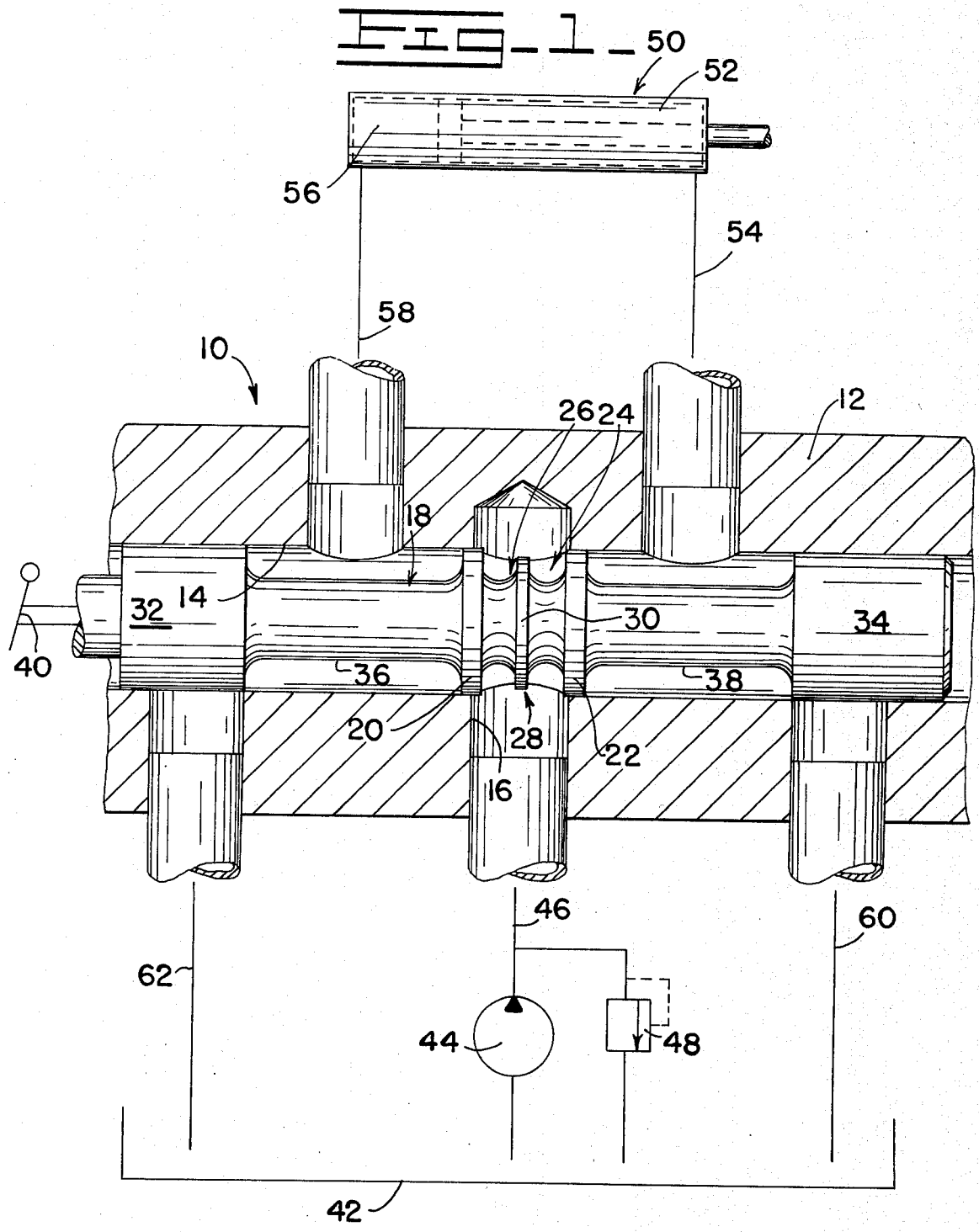
FIG. 1 is a central, sectional view through the inventive valve, showing in addition the operating fluid circuit associated therewith.
Figure 2:
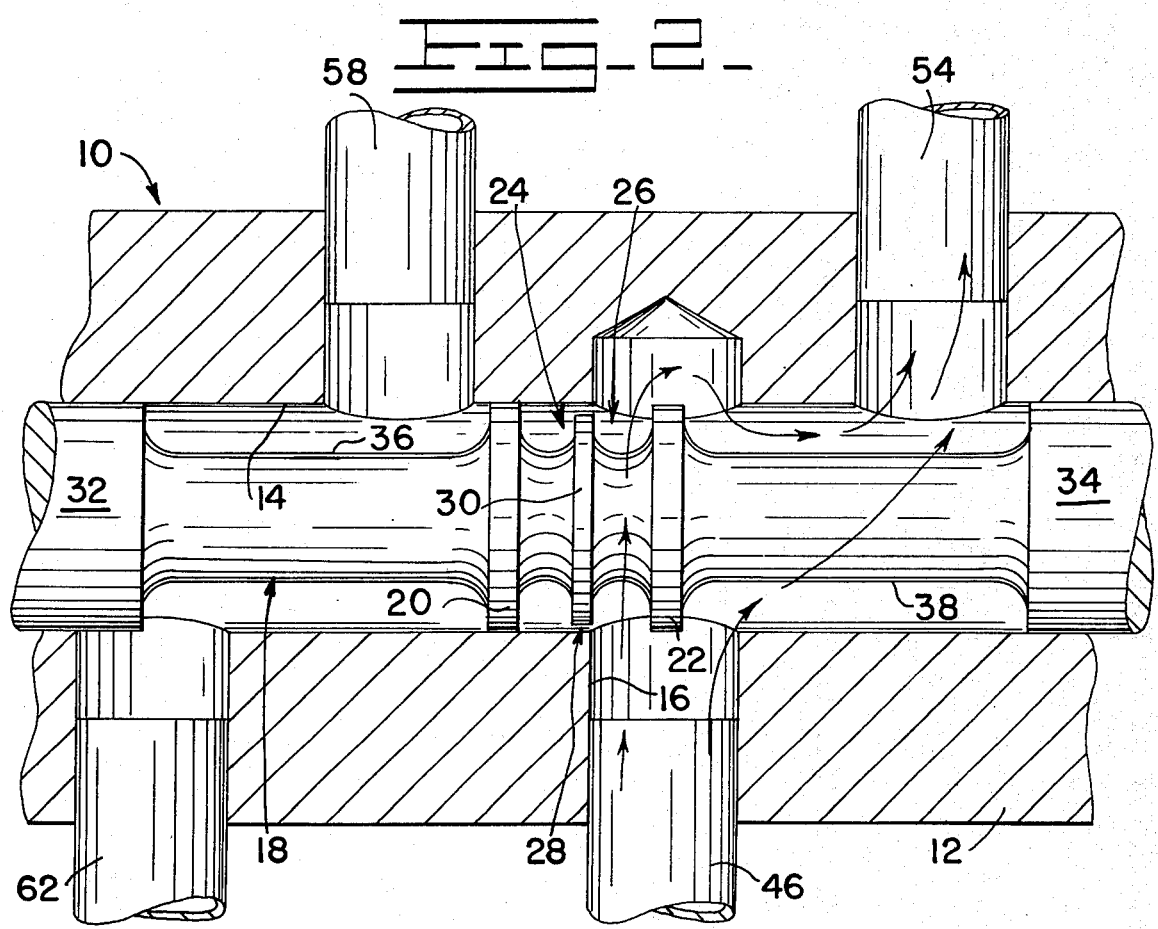
FIG. 2 is a central, sectional view of the valve shown in FIG. 1, with the valve spool moved to a flow-directing position.

Shown in FIGS. 1 and 2 is a flow control valve 10 incorporating the invention. The valve 10 includes a valve body 12 which defines a cylindrical main bore 14, and a cylindrical cross-drilled bore 16. The cross-drilled bore 16 communicates with the main bore 14, and extends into, through and beyond the main bore 14 as shown. In fact, the crossbore 16 is of smaller diameter than the main bore 14, and passes within the main bore. Thus, a true annular channel in the area of connection of these bores 14,16 does not exist, but rather the main bore 14 is continuous along its length, except for the interception of the cross-bore 16 into and out of the main bore 14.

Reciprocally disposed within the main bore 14 is a valve spool 18. The valve spool 18 is reciprocable along a line of motion defined by the longitudinal axis of the main bore 14. The spool 18 defines lands 20,22, connected by a connecting portion 24. The connecting portion 24 defines groove means 26 between the lands 20,22. Guide means 28 in the form of an annular rib 30 are connected to the valve spool 18. Such annular rib 30 is fixed to the connecting portion 24, substantialy midway between the lands 20,22. The spool 18 also defines end lands 32,34 respectively outwardly of the lands 20,22. A reduced-diameter portion 36 interconnects lands 32,20, and a reduced diameter portion 38 interconnects lands 34,22. A positioning control 40 is included for positioning the spool 18 relative to the valve body 12.

The cross bore 16 is coupled to a source of fluid in a reservoir 42 through a fluid pump 44 and an intermediate conduit 46. A relief valve 48 is exposed to the pressure in the conduit 46 to limit the maximum of pressure thereof in a conventional manner.

A double-acting hydraulic cylinder 50 has its rod end 52 connected to a conduit 54, and its head end 56 connected to a conduit 58. These conduits 54,58 communicate with the main bore 14 on either side of the cross bore 16. Outward of the conduits 54,48, and also communicating with the main bore 14, are drain conduits 60,62 which communicate with the reservoir 42.

In the closed position of the valve spool 18, the lands 20,22 are on either side of the cross bore 16 and in blocking relation with the valve body 12 within the main bore 14 (FIG. 1). The main bore 14 is thereby blocked off from the cross bore 16. The end lands 32,34 meanwhile block off drain conduits 62,60.

Figure 3:
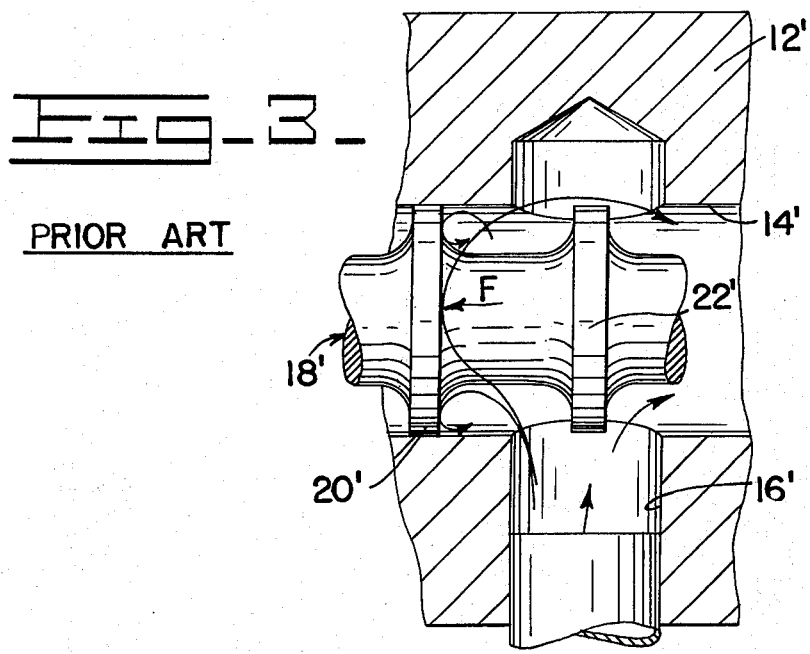
FIG. 3 is a partial sectional view of a prior art flow control vlave.

Movement of the valve spool 18 to the position of FIG. 2 moves land 22 into the cross bore 16 to allow fluid flow from the cross bore 16 through the main bore 14 and through the conduit 54. The land 20 moves with the land 22 away from the cross bore 16. Fluid flows from cross bore 16 through the groove means 26, into the main bore (and also directly from the cross-bore 16 into the main bore 14), and through the conduit 54 to retract the cylinder 50, the fluid in the head end 56 of the cylinder 50 flowing through conduit 58, main bore 14, and drain conduit 62. With the valve spool 18 in such position (FIG. 2), the annular rib 30 is generally aligned with a side of the cross bore 16, and is sized so that it extends to adjacent the valve body 12 within the main bore 14. Then annular rib 30 thereby substantially blocks off fluid flow from the area of the land 20, whereby the land 20 is substantially shielded from the impact of the fluid flow between the cross bore 16 and main bore 14. This is in contrast to the prior art system shown in FIG. 3, which incorporates a similar cross bore 16' and main bore 14', and a valve spool 18', but no guide means between the lands 20', 22'. Since there is no annular channel interconnecting the cross bore 16' and main bore 14', the fluid flow will take place as shown in FIG. 3. That is, the land 22' is still in close relation with a substantial portion of the main bore 14'. Consequently, flow must take place as shown over and under the land 22' as viewed in FIG. 3. (This is also, of course, true of the device of FIGS. 1 and 2). With land 20' exposed as it is to the force of the fluid flow thereon, and with land 20' in blocking relation with main bore 14', but with land 22' not in blocking relation with the main bore 14', a resultant force F will be applied to the valve spool 18' as shown in FIG. 3, tending to hold the valve spool 18' in an open position.

The device of FIGS. 1 and 2 overcomes this problem by means of the annular rib 30 substantially blocking off fluid flow from the land 20 and also by guiding fluid flow in a direction substantially perpendicular to the line of motion to the valve spool 18.

Consequently, substantially no force is applied by the fluid flow to the spool 18 along the line of motion of the spool 18.

The central position of the rib 30 between lands 20,22 means, of course, that the spool 18 operates similarly when moved to its rightward position (not shown).

It should be appreciated that while a single flow-directing rib 30 is shown, several axially spaced annular flow-directing ribs may be integrally related to the connecting portion 24 without departing from the spirit of the subject invention. Such plurality of ribs would form a plurality of transverse annular flow paths to minimize axial thrust on the spool 18 on the upstream side of the metering paths.

What is claimed is:
1. A flow control valve comprising:
a valve body defining a main bore and a cross bore extending into, through, and beyond the main bore;
a valve spool reciprocable along a line of motion within the main bore and defining first and second lands connected by a connecting portion which defines groove means between the first and second lands;
the valve spool being movable along said line of motion to a first position wherein the first and second lands are on either side of the cross bore and in blocking relation with the valve body within the main bore; and to a second position wherein the first land is moved into the cross bore to allow fluid flow between the cross bore and main bore, the second land moving with the first land away from the cross bore; and
means comprising an annular rib fixed to the connecting portion substantially midway between the first and second lands and extending adjacent to the valve body within the main bore, said rib being generally alined with a side of the cross bore in said second position and cooperating with said first land for guiding fluid flow through the groove means in a direction substantially perpendicular to the line of motion of the valve spool while substantially blocking off fluid flow from the area of the second land, whereby the second land is substantially shielded from the impact of fluid flowing between the cross bore and main bore.

2. The flow control valve of claim 1 wherein the cross bore is of smaller diameter than the main bore.

* * * * *